(12) United States Patent
Magielse et al.

(10) Patent No.: US 11,158,317 B2
(45) Date of Patent: Oct. 26, 2021

(54) METHODS, SYSTEMS AND APPARATUS FOR VOICE CONTROL OF A UTILITY

(71) Applicant: SIGNIFY HOLDING B.V., Eindhoven (NL)

(72) Inventors: Remco Magielse, Tilburg (NL); George Frederic Yianni, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 62 days.

(21) Appl. No.: 16/612,023

(22) PCT Filed: May 2, 2018

(86) PCT No.: PCT/EP2018/061156
§ 371 (c)(1),
(2) Date: Nov. 8, 2019

(87) PCT Pub. No.: WO2018/206359
PCT Pub. Date: Nov. 15, 2018

(65) Prior Publication Data
US 2020/0168220 A1 May 28, 2020

(30) Foreign Application Priority Data
May 8, 2017 (EP) .................................. 17169899

(51) Int. Cl.
*G10L 15/22* (2006.01)
*H05B 47/12* (2020.01)
(Continued)

(52) U.S. Cl.
CPC .......... *G10L 15/22* (2013.01); *F21V 23/0435* (2013.01); *G10L 15/1815* (2013.01);
(Continued)

(58) Field of Classification Search
CPC ......................... G10L 15/22; G10L 2015/223
See application file for complete search history.

(56) References Cited

U.S. PATENT DOCUMENTS

| 9,721,586 B1* | 8/2017 | Bay ........................ H04R 1/345 |
| 2001/0000534 A1 | 4/2001 | Matulich et al. |

(Continued)

*Primary Examiner* — Jialong He (57) ABSTRACT

A method of using speech recognition to control a utility, comprising: receiving a speech command spoken by a user and captured by at least one microphone; processing the speech command in order to automatically recognize and enact an intention of the user in each of a sequence of spoken elements in the command, the elements having an order from first to last in time, with at least one of the elements indicating an intention of the user to control the utility and a further one or more of the elements each specifying a respective parameter of the control intended by the user; and after the speaking of the first element in the voice command but prior to enacting the last element of the command, controlling illumination emitted by one or more luminaires of a lighting system to provide feedback to the user regarding the processing of the speech command, wherein the utility comprises one of: heating, air conditioning, ventilation, a window treatment, or play-out of media from an entertainment system.

12 Claims, 3 Drawing Sheets

(51) Int. Cl.
  *F21V 23/04* (2006.01)
  *G10L 15/18* (2013.01)
  *G10L 17/22* (2013.01)

(52) U.S. Cl.
  CPC .............. *G10L 17/22* (2013.01); *H05B 47/12* (2020.01); *G10L 2015/223* (2013.01); *G10L 2015/225* (2013.01)

(56) References Cited

U.S. PATENT DOCUMENTS

| | | | | |
|---|---|---|---|---|
| 2001/0041982 | A1* | 11/2001 | Kawasaki | G10L 15/26 704/275 |
| 2002/0044066 | A1* | 4/2002 | Dowling | H05B 47/12 340/815.46 |
| 2007/0033054 | A1* | 2/2007 | Snitkovskiy | G10L 15/22 704/275 |
| 2008/0114603 | A1* | 5/2008 | Desrochers | G10L 15/22 704/275 |
| 2015/0162006 | A1* | 6/2015 | Kummer | H04N 21/47217 704/275 |
| 2015/0324706 | A1* | 11/2015 | Warren | G05B 15/02 700/275 |
| 2016/0071389 | A1 | 3/2016 | Sun et al. | |
| 2018/0092189 | A1* | 3/2018 | Reier | G10L 15/22 |

* cited by examiner

METHODS, SYSTEMS AND APPARATUS FOR VOICE CONTROL OF A UTILITY

CROSS-REFERENCE TO PRIOR APPLICATIONS

This application is the U.S. National Phase application under 35 U.S.C. § 371 of International Application No. PCT/EP2018/061156, filed on May 2, 2018, which claims the benefit of European Patent Application No. 17169899.6, filed on May 8, 2017. These applications are hereby incorporated by reference herein.

TECHNICAL FIELD

The present disclosure relates to the use of speech recognition to control a utility such as lighting, heating, air-conditioning, ventilation, window treatments or a home entertainment system.

BACKGROUND

Voice control is becoming more and more commonplace as a means by which a user can control various appliances around the home or even elsewhere, such as the office. For instance, a smart speaker is a speaker device embedded with a virtual digital assistant enabling the user both to control music played out through the speaker and also to conduct other functions, e.g. ordering take-out, making to-do lists, etc. Similarly, a virtual digital assistant is now often included in many other forms of user terminal such as smartphones, tablets, desktop and laptop computers, and wearable smart devices such as smart watches and smart glasses.

Voice based control is also becoming a means by which users can control utilities around the home or office, such as to control a wirelessly connected lighting system, heating system, or such like. This may be achieved based on a dedicated voice recognition agent included in a component of the utility system in question (e.g. a lighting bridge or wall panel in the case of a lighting system). Or increasingly, the control of the utility may be effected via a general-purpose digital assistant running on a user device, which is able to interface to the utility system via a wired or more often wireless (e.g. Wi-Fi, Bluetooth or ZigBee) connection between the user terminal and the utility system. As an example, the user can simply speak a voice command aloud in a room of his/her home, such as "dim down the lights", "increase heating to 21 degrees", or "set atmosphere to cosy", and the virtual digital assistant on any suitable connected smart device in listening range (e.g. the user's smart speaker, mobile terminal, desktop PC or wearable device) may detect this and control the lights and/or heating accordingly.

A virtual digital assistant (sometimes also just called a digital assistant or virtual assistant) may refer to any software agent employing speech recognition as a means by which a user can control functionality of any kind of appliance. The full functionality behind the virtual digital assistant may in principle be included in the same application on the local user device in question, but more often, the VDA is in fact a front-end client application accessing a more sophisticated back-end service hosted on a server. Either way, the user's interface to the agent is through the particular user device on which the user has the VDA installed.

SUMMARY

However, this can lead to issues as there is a separation between the speech interface and the actual output. Whenever the user issues a voice command, the command is only processed once the user completes the command. The user has little or no feedback on the voice command that he or she has just spoken, at least not until the user waits to see whether or not the complete command has had the desired effect on his/her environment (e.g. dimming the lights, adjusting the heating, playing a particular music track, etc.). For instance, if the command fails the user has no indication as to where the command failed. Furthermore, it is difficult for a user to get an understanding of what the voice command will do, since he/she does not receive direct feedback of its effect in advance of the complete effect being rendered. Current solutions to such problems are based on user feedback output by the device receiving the voice commands, e.g. animation on a mobile phone screen or pulsing LEDs on a smart speaker. However, these are no longer practical if the voice receiver becomes more integrated in the user's environment. This will become a bigger issue as voice becomes a ubiquitous and hidden feature of our homes and offices, since the current on-device user feedback is no longer possible.

The following provides a method to provide a user with feedback concerning a voice command as it is being spoken and processed by the system. The user has at least one interface that is capable of receiving voice commands, and there is also provided at least one controllable lighting device which can be controlled based on interaction with the voice interface. The method comprises controlling the lighting in order to give feedback on the processing of the command as it is being spoken, such as by previewing the desired light settings as the user issues the command, and/or rendering animations through the lighting system to provide feedback on the state of processing of the command.

According to one aspect disclosed herein, there is provided a method of using speech recognition to control a utility, the method comprising: receiving a speech command spoken by a user and captured by at least one microphone; processing the speech command in order to automatically recognize and enact an intention of the user in each of a sequence of spoken elements in the command, the elements having an order from first to last in time, with at least one of the elements indicating an intention of the user to control the utility and a further one or more of the elements each specifying a respective parameter of the control intended by the user; and after the speaking of the first element in the voice command but prior to enacting the last element of the command, controlling illumination emitted by one or more luminaires of a lighting system to provide feedback to the user regarding the processing of the speech command.

Thus there is provided real-time feedback regarding a voice command input using a general lighting system. The utility being controlled, and for which feedback is provided, may comprise the lighting in the same locality as the user (e.g. same room), or the lighting elsewhere (i.e. where the user cannot directly experience the effect of the command through his/her own senses at the time of speaking it). Alternatively the utility in question may be another utility other than lighting, such as air conditioning, heating, ventilation, an electronically-controlled window treatment (curtains or blinds), or even playout of media such as music or video. Again the utility being controlled may either be in the same location as the user or elsewhere (beyond the user's immediate zone of experience).

In embodiments, said feedback comprises at least: acknowledging when the last element has been successfully recognized and is in the process of being executed in order to be enacted. Alternatively or additionally, at least part of said feedback is provided prior to the speaking of the last element (53) of the command. For example said feedback may comprises at least acknowledging that the first element of the command has been recognized (thus indicating that the speech recognition algorithm is now primed to listen for further elements of the command). As another example, said feedback may comprise at least an indication that there was an error in recognizing one of the elements of the command, thereby prompting the user to re-speak said one of the elements (e.g. there is too much background noise, or the command was not spoken loudly enough, or was spoken too quickly, for the command or a particular element of it to be successfully recognized). As yet another example, said feedback may comprise at least providing a preview an effect of each individual one of one or more of the elements of the command.

Further, it is identified herein that the feedback provided to the user should be co-located with the user, but the execution of the command may take place at another location.

Therefore preferably, the method may further comprise: automatically determining a location of the user, based thereon automatically identifying one or more luminaires visible from the detected location of the user, and automatically selecting the one or more luminaires through which to provide said feedback from amongst those identified based on the detected location of the user For example a user may be in the living room, but want to turn the lights off in the bedroom. In this case the actual command will be one location—the execution location—but the feedback may be at a second location—the feedback location.

In further embodiments, the method may comprise automatically selecting the one or more luminaires through which to provide said feedback based on which luminaires of the lighting system are capable of rendering the feedback.

In further embodiments, the method may comprise automatically selecting an effect with which to provide the feedback in dependence on an effect currently being rendered by the one or more luminaires used to provide the feedback.

In yet further embodiments, the method may comprise automatically determining an identity of the user, and, in dependence on the determined identity of the user, automatically selecting the one or more luminaires through which to provide the feedback and/or an effect with which to provide the feedback.

According to another aspect disclosed herein, there is provided a computer program product comprising code embodied on computer-readable storage and configured so as when run on one or more processing units of a control system to perform operations in accordance with any of the disclosed methods.

According to another aspect disclosed herein, there is provided a control system comprising: memory comprising one or more memory units, the memory storing code; and one or more processing units arranged to run the code from said memory, the code being configured so as when thus run on the one or more processing units to perform operations in accordance with any of the disclosed methods.

BRIEF DESCRIPTION OF THE DRAWINGS

To assist understanding of the present disclosure and to show how embodiments may be put into effect, reference is made, by way of example only, to the accompanying drawings in which.

DETAILED DESCRIPTION OF EMBODIMENTS

As mentioned above, voice based commands for lighting systems are becoming commonplace with rise of smart speakers, smart phone voice assistants, and the like. As these become more inconspicuous, it would be desirable to provide alternative user feedback mechanisms.

The following provides a method of giving feedback to the user regarding a voice command as it is being spoken and processed by the system. The feedback provided to the user should be co-located with the user, but the execution of the command may take place at another location.

The method may further comprise automatically determining which lighting device and/or what light effect to use to provide the feedback (e.g. selecting the luminaire closest to user or within the user's field of view to render the feedback, or selecting a lighting effect that matches current scene).

The feedback may relate to any one or more of at least three stages in the process: (a) the system provides feedback as to the current processing state, (b) the system provides feedback on the completion of the command and end result, and/or (c) the system previews the execution of the command in the case of lighting control.

For instance, the feedback provided may distinguish between a state in which the system is receiving a voice command (to show the user that the system is listening), a state in which the command cannot be processed (e.g. too much background noise), a state in which the command has successfully been received and is being processed (to show that the system is about to respond and prevent the user from issuing the same command again), etc. The feedback may further indicate to the user that the spoken command is not loud enough, or that the user spoke too rapidly, etc.

In further embodiments, a direct preview is given of each element of the command as-and-when it is spoken. For example, when the user says 'set the lights . . . ' the lights nearby the user blink, and then when the user continues ' . . . in the living room' only the lights in that particular location continue to blink. In yet further embodiments, the luminaire that is used to provide the feedback to the user is selected not merely based on location, but also on factors such as capabilities (e.g. white vs. colour), visibility (e.g. ceiling pendant vs. light strip under cabinet), and/or current state (e.g. scene in which it is active, which user has set it to that scene, and/or which user is issuing the voice command).

The feedback provided can cover commands directed at the lighting system, but also other systems (e.g. HVAC, audio, etc.). By way of example, embodiments below will be described in relation to a scenario where the user controls the lighting, but it will be appreciated that this is not limiting of all possible applications of the disclosed techniques.

Figure 1:
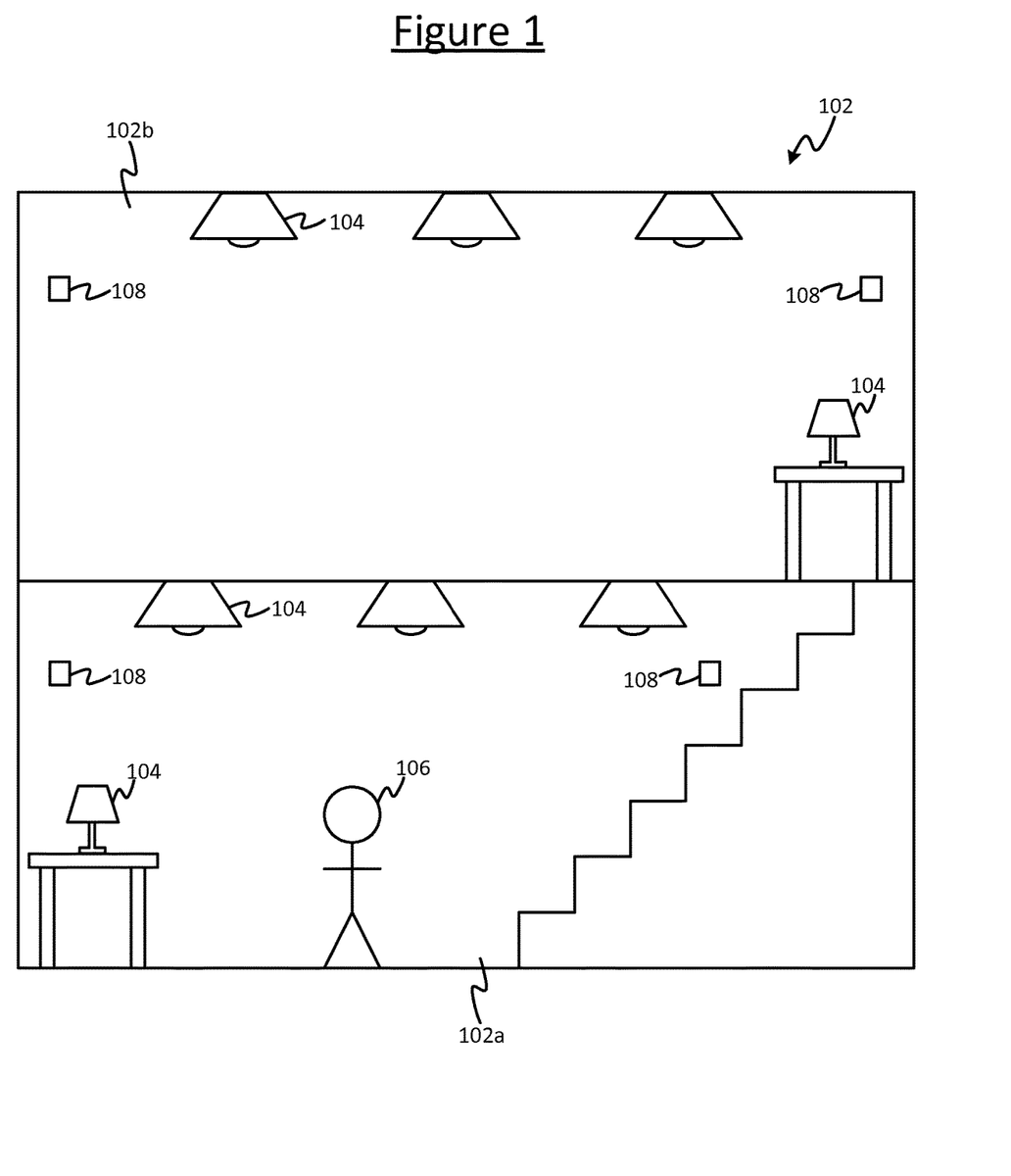
FIG. 1 is a schematic illustration of an environment comprising a lighting system.

FIG. 1 illustrates an example environment 102 in which embodiments disclosed herein may be employed. The environment 102 may take the form of an indoor space such as one or more rooms of a home, office or other building; an outdoor space such as a garden or park; a partially covered space such as a gazebo; or a combination of such spaces such as a campus or stadium comprising both indoor and outdoor spaces.

The environment 102 is equipped with a plurality of luminaires 104 installed or otherwise disposed at different locations throughout the environment 102. A luminaire may refer to any kind of illumination device for illuminating an environment or part of the environment occupied by a user 106, whether providing ambient lighting or task lighting. Each of the luminaires 104 may take any of a variety of possible forms, such as a ceiling or wall mounted luminaire, a free-standing floor or table luminaire, or a less traditional form such as a luminaire embedded in a surface or item of furniture (and the different luminaires 104 in the environment 102 need not take the same form as one another). Whatever form it takes, each luminaire 104 comprises at least one lamp (illumination element) and any associated housing, socket and/or support. Examples of suitable lamps include LED-based lamps, or traditional filament bulbs or gas discharge lamps.

The environment 102 is also equipped with one or more microphones 108 disposed at one or more locations throughout the environment 102. Each of the microphones 108 may take the form of a stand-alone microphone device, or alternatively a microphone integrated in another user device such as a static or mobile user terminal. Examples of user terminals having a microphone 108 which may be accessed for the present purposes include: a laptop or desktop computer placed around the home or office; a mobile terminal such as a smartphone or tablet; a wearable device carried or worn about the user's person; or a media device such as a smart speaker, smart television set or set-top box, home media centre, etc.

In some scenarios the environment 102 may be divided into a plurality of different zones or localities 102a, 102b, such as different rooms, each illuminated by a different respective subset of one or more of the luminaires 104. For the present purposes these different zones 102a, 102b are distinct from one another in that, when the user 106 is occupying one zone 102a, then he/she cannot directly experience the effect of an adjustment he/she is making to a utility (in this case the lighting) in another zone 102b, i.e. does not sense the utility in the other locality first-hand through his or her own bodily senses. In the case of lighting this means the user does not see the lighting in the other zone (e.g. other part of the house or office such as another room). In the schematized example of FIG. 1 for instance, there are illustrated two rooms: a downstairs room 102a and an upstairs room 102b, with the user 106 happening to currently occupy the downstairs room 102a. It will be appreciated of course that the user's environment 102 may in fact comprise more than two rooms (e.g. living room, kitchen, hall, bathroom and multiple bedrooms in home; or multiple offices, hallways, a reception and a canteen or breakroom in an office building).

Figure 2:
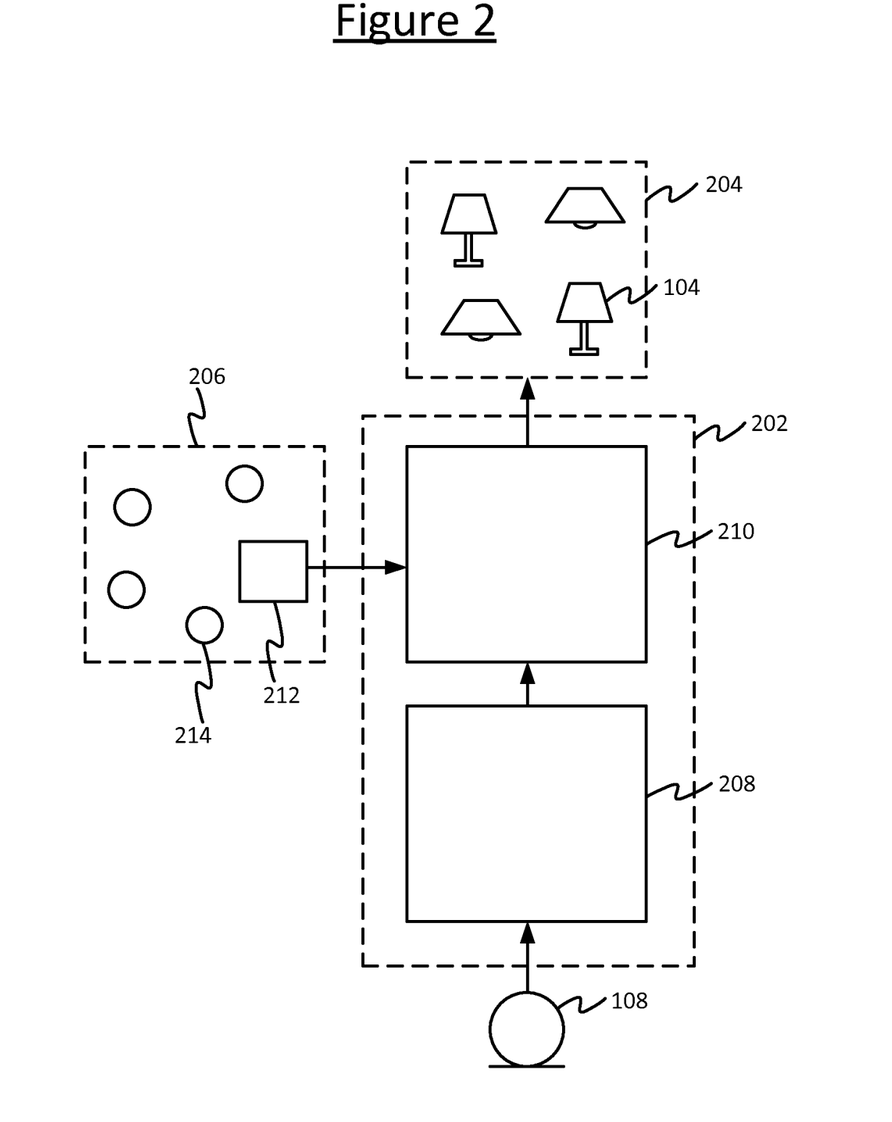
FIG. 2 is a schematic block diagram of a control system for controlling a utility.

FIG. 2 illustrates a control system 202 enabling the user 106 to control the lighting from one or more of the luminaires 104 based on speech commands spoken by the user 106 and captured by at least one of the one or more microphones 108. This may be to control the lighting in the same part of the environment 102a as that in which the user 106 speaks the voice command, or a different part 102b (e.g. in an upstairs room 102b while the user 106 is downstairs 102a).

The control system 202 comprises a speech recognition algorithm 208 arranged to receive an audio signal captured by the at least one microphone 108 from the environment 102 or part thereof, wherein at times the audio signal will comprise a speech command spoken by the user 106 in the relevant part of the environment 102. The control system 202 further comprises a controller 210 coupled to the speech recognition algorithm 208 in order to receive an indication of control elements identified by the speech recognition algorithm in the received audio signal. The controller 210 of the control system 202 is also coupled to a lighting system 204 comprising the luminaires 104 discussed in relation to FIG. 1. The controller 210 can thereby control the lighting system based on the identified control elements in order to adjust one or more aspects of the illumination emitted by the luminaires 104, e.g. to turn one or more of them on or off, dim the illumination level up or down, adjust the colour of the emitted illumination, or set a dynamic effect.

In embodiments the controller 210 of the control system 202 is configured to automatically determine the location of the user 106, at least in terms of which of a set of discrete, predefined zones 102a, 102b (e.g. which room) the user 106 is currently found in.

In some such cases, the controller 210 may be configured to do this based on the audio captured by the microphone 108. If the location of the microphone 108 or microphones 108 that captured the voice command is/are known to the controller 210, then the fact of having received the voice command through that/those particular microphone(s) 108 gives an indication of an approximate locality of the user 106 speaking the command. For example, if a microphone is disposed in each room or zone 102a, 102b, and voice does not substantially travel between the rooms or zones, then identifying which microphone 108 captured the voice command implicitly gives an indication of which room or zone the user is in. Optionally, if the microphone 108 is a directional microphone comprising an array of microphone elements, or if the command is captured from multiple microphones 108 at different positions, then this can also be used to compute a more precise estimate of the user's location. For instance a direction of arrival can be detected based on the relative phases and/or amplitudes of the same signal being received at each element in the directional microphone. And/or, if instances of the signal are received at multiple microphones 108 at different positions, then coordinates of the user 106 can be computed by applying a suitable localization calculation such as triangulation, trilateration, multilateration or fingerprinting to the received instances of the signal.

In further alternative or additional embodiments, the controller 210 of the control system 202 may be configured to determine the location of the user 106 by accessing a separate localization system 206 for automatically detecting the current location of the user 106. The localization system comprises a set of one or more reference nodes 214, and a localization algorithm 212 for determining the location of the user 106 based on the nodes 214. In some cases the set of reference nodes 214 may comprise just a single node 214 or at least a single node in each of the different possible zones (e.g. rooms) 102a, 102b. For instance, the set of nodes 214 may comprise a single camera in each zone 102a, 102b and the localization algorithm 212 may comprise an image recognition algorithm configured to detect whether or not (on a yes-no basis) the user 106 is present in its respective zone (e.g. room). Thus the location of the user is detected on at least a per-zone (e.g. per-room) basis.

In other embodiments, the set of nodes 214 may comprise a network of wireless nodes enabling detection if the user's coordinates throughout the environment 102. These could be dedicated anchor nodes of an indoor positioning network, or pre-existing wireless nodes such as wireless access points that are already beaconing for discovery purposes, or even satellites in a satellite positioning network. Whatever form they take, a signal is transmitted from each of a plurality of the wireless reference nodes 214 to be measured by a portable or wearable device disposed about the user's person (a device centric approach), or vice versa, a signal is transmitted by the user's device to be detected by a plurality of the nodes 214 (a network centric approach). The device or the nodes, respectively, take measurements of a property of the different received instances of the signal (e.g. received signal strength, time of flight or angle of arrival). The localization algorithm 212 is arranged to receive these measurements and apply to them any suitable localization calculation, such as a triangulation, trilateration, triangulation or fingerprinting algorithm, thereby detecting the coordinates of an estimated position of the user 106. The localization algorithm 212 can then look up the coordinates in a map (e.g. floorplan) of the environment 102 in order to detect which zone the user 106 is found in (e.g. which room).

Or as a simpler variant of this, the reference node 214 found to be closest to the user 206 could be taken as an indication of which zone (e.g. room) the user 106 is currently in. E.g. if a certain anchor node or access point in a certain room has the strongest signal strength or shortest time of flight between that node and the device about the user's person, then the user 106 can be assumed to be in that room with a reasonable degree of confidence.

Various suitable localization technologies are in themselves familiar to a person skilled in the art and will not be repeated at length herein. A combination of techniques may also be employed in order to improve positioning accuracy.

Whatever technique is chosen, the detected location is this made available to the controller 210. If a separate location system 206 is indeed used, then the localization algorithm 212 may also detect the identity of the user 106 in order for the controller 210 to match this up with the voice command detected by the speech recognition algorithm. This can be done for example by facial recognition, or receiving an ID signal from a mobile or wearable device carried about the user's person, combined with a speech recognition algorithm 208 capable of detecting the identity of the user 106 from his/her voice signature. Alternatively if the presence of only one user is detected, the command and the detected position may simply be assumed by the controller 210 to originate from the same person. Or as another variant, the user 106 makes a gesture to indicate when speaking, which is detected by a gesture-sensing localization node 214 (e.g. camera).

In terms of physical implementation, each of the speech recognition algorithm 208, controller 210 and optional localization algorithm 212 may be implemented in the form of code (software) stored on a memory and arranged to run on a processing apparatus. The memory in which any given one of these modules 208, 210, 212 is stored may comprise one or more memory units employing one or more memory media (e.g. electronic, magnetic or optical) housed in one or more devices at one or more geographic sites. The processing apparatus on which any given one of these modules 208, 210, 212 is stored may comprise one or more processing units housed in one or more devices at one or more geographic sites. Where required, distributed storage and processing techniques are in themselves known to a person skilled in the art.

In alternative implementations, it is not excluded that any one or more of the speech recognition algorithm 208, controller 210 and optional localization algorithm 212 may be implemented in the form of hard-wired circuitry, or configurable or reconfigurable hardware such as a PGA or FPGA, or any combination of hardware or software.

In whatever form implemented, each of these modules 208, 210, 212 may be implemented in any one or more devices at any one or more of a variety of physical locations. For example, any one or more of the speech recognition algorithm 208, controller 210 and localization algorithm 212 may be implemented in a user terminal such as a desktop computer, laptop, tablet or smart speaker disposed around the user's home or environment 102; or a portable user terminal such as a smart phone or tablet carried about the user's person; a wearable device worn about the user's person; and/or a server at a remote location (the server comprising one or more server units at one or more geographic sites). As another example, any one or more of the speech recognition algorithm 208, controller 210 and localization algorithm 212 may be implemented as a distributed function embedded in each of the luminaires 104. The microphone(s) 108 may be incorporated in the same device as any one or more of the speech recognition algorithm 208, controller 210 and/or localization algorithm 212, or in a different device or devices. The speech recognition algorithm 208, controller 210 and localization algorithm 212 may be implemented in the same device as one another or in separately housed devices. Further, any given one of these could be implemented in a single device or distributed across multiple devices. Again it is noted that distributed computing techniques are in themselves known in the art.

Where the modules 208, 210, 210 need to communicate externally with one another, and/or between different distributed parts of themselves, and/or with external elements such as the microphone(s) 108 and/or reference nodes 214, this communication may be implemented by means of any suitable wired or wireless connection or network, or combination of such. Examples of suitable wired technologies include Ethernet, DMX and the Internet. Examples of suitable wireless technologies include Wi-Fi, Bluetooth, ZigBee, etc.

Whatever form the physical implementation takes, the speech recognition algorithm 208 is configured to identify the meaning intended by the user 106 in a speech command spoken by the user in order to control one or more of the luminaires 104 in the lighting system 204.

Figure 3:
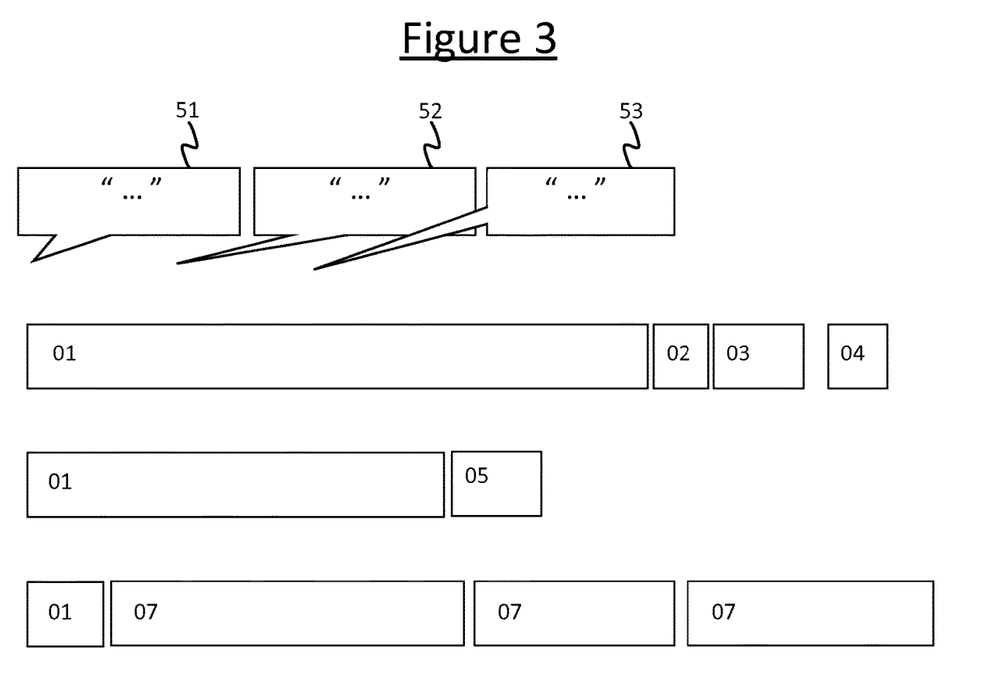
FIG. 3 is a timing diagram showing the timing of a selection of different possible feedback animations.

As illustrated in FIG. 3, a voice command typically comprises more than one spoken element or component 51, 52, 53, each specifying a different aspect of the command. Three elements are illustrated by way of example in FIG. 3 but it will be appreciated that other numbers are possible. At least one of the elements indicates the user's desire to control the lighting, this typically being the first element 51 to be spoken chronologically, but not necessarily.

For instance, a simple command may be "lights on". The first element "lights" indicates that the user wishes to control the lighting, and the second element "on" specifies the desired value of the parameter on/off. As another example, the command comprises at least three elements: one expressing the desire to control the lights, one specifying a light setting, and one specifying a location at which to effect the control. The specified light setting may be for example: on/off, a change in dim level, a colour setting, or a name of a dynamic effect (i.e. a time-varying or spatio-temporal effect). E.g. the three elements could be: "dim up [51] the lights [52] in the kitchen [53]". In this example the first element 51 specifies the setting change to increase the overall intensity, the second element 52 expresses the desire to control the lighting (or alternatively this could be implicit in the word "dim" or the phrase "dim up"), and the third element 53 specifies that the change is to be effected in the kitchen 102a only. Another example would be: "System, set the lights [51] in the bedroom [52] to a cosy colour temperature [53]", etc. In this example the first element 51 tells the speech recognition algorithm 208 that the user 106 intends to issue a lighting control command, the second element 52 specifies the location for the control to be the bedroom 102b, and the third element specifies a colour setting (in this case expressed as a desired lighting atmosphere).

The speech recognition algorithm 208 may be a general purpose speech recognition algorithm implemented as part of a virtual digital assistant (sometimes just referred to as a digital assistant or virtual assistant). Alternatively the speech recognition algorithm 208 may be dedicated to lighting control. Either way, it may be configured to recognize the intention of the user 106 in each of the spoken elements 51, 52, 53, e.g. based on keyword recognition, or based on more sophisticated techniques such as natural language processing (NLP). Speech recognition in itself is a known art.

The controller 210 receives from the speech recognition algorithm 208 an indication of the intention of the user 106 as extracted from each of the elements 51, 51, 53 of the speech command by the speech recognition algorithm 208. Based on these, the controller 210 controls the lighting system 204 to set the illumination emitted by one or more of the luminaires 104 accordingly.

The processing of the speech command thus comprises at least two aspects: the recognition of the speech, and the execution of the command (i.e. the actual rendering of the specified lighting effect).

Furthermore, in accordance with embodiments disclosed herein, the controller 210 also controls the lighting system 204 to provide feedback on the processing of the speech command, the feedback being provided prior to the completion of the rendering of the full command. This may comprise providing feedback on the recognition of the command and/or providing feedback on the state of the execution of the command. The feedback may comprise outputting a certain indicative colour, pattern, dynamic effect or animation through one or more of the luminaires 104.

For instance, the feedback may be output after the speaking of the final element 53 of the command but prior to the execution, to indicate that the command has been received and recognized but is still being processed for actual execution of the specified effect. This prevents the user feeling that the command has not been successfully registered by the system and perhaps attempting to speak the command again.

In further examples, the feedback may be output prior to the user speaking the final element 53 of the command. For example, this could be used to indicate that the speech recognition algorithm has recognized the first element 51 (e.g. a wake-up word) and is awaiting one or more further elements 52, 53. Or the feedback may indicate that the recognition of one or more elements 51, 52 has failed, and perhaps also indicate the reason, e.g. background noise too high, or the user 106 has spoken too quietly or quickly. The user 106 can then re-speak the failed part of the command.

As another example, the feedback may provide a preview of the individual effect of individual elements 51, 52, 53. E.g. when the user specifies a particular group of luminaires 104, this luminaires flash or emit some other effect to distinguish them from other, surrounding luminaires; then when the user specifies a particular colour, the specified luminaires adopt this colour at the current dim level; and then when the user specifies a dim level, the specified luminaires dim up or down accordingly with the already-set colour. This helps the user 106 understand the effect of the different parts of the command as he/she is formulating the command.

In general, the feedback location need not necessarily be the same as the location where the lights are being controlled, especially if not being used to provide a preview. E.g. the voice command may specify control of the lights in a different room 102b than the user 106 is currently located in. In this case the controller 210 may select the most appropriate luminaire(s) 104 to render the feedback. This may be the closest luminaire or luminaires 104, based on any of the above-described localization techniques. And/or, one or more other factors may be taken into account, such as the capability of the luminaire. Thus the controller 210 selects a luminaire 104 to provide the feedback that is well visible to the user and has sufficient capabilities to display the relevant information. E.g. a luminaire 104 with colour capabilities may be preferred over a luminaire with only dimming capabilities, even if it is further away from the user.

By way of illustration, some example feedback types are given in Table 1 below.

TABLE 1

| ID code | Stage of processing | Example type of feedback |
|---|---|---|
| 01 | Voice command receiving (i.e., listening) | Slow pulsing in saturation from blue to white. |
| 02 | Voice command fully received | Brightness pulse Dim light(s) to 10% of the brightness for 500ms |
| 03 | Performing computation on voice command | Slow pulsing in brightness |
| 04 | Voice command successfully executed | Light long blink green |
| 05 | Voice command failed to execute | Light two short blink red once |
| 06 | Error while processing voice command | Light blink red and fade out |
| 07 | Direct preview of outcome | |
| . . . | . . . | |

In embodiments the controller 210 is configured to automatically determine the current location of the user 106 based on the microphone(s) 108 and/or location system 206 (as discussed previously), and based thereon to set the feedback location to that of the user 106, regardless of the location specified in the voice command for the lighting to be controlled. So if the user 106 is currently detected in one room or zone 102a such as the kitchen, but specifies in the voice command to control the lighting in another room or zone 102b such as the bedroom (where the user cannot see the effect of the command from his/her current location); then the controller 210 will automatically detect which room or zone 102a the user 106 is currently located in at the time of speaking the command, and based on this select one or more of the luminaires 104 visible from that room or zone 102a, and provide the feedback through that/those selected luminaires 104.

To achieve this the controller 210 may be provided with a location database recording the locations of the luminaires 104, e.g. in terms of which room or zone they are located in, or in terms of their coordinates. The controller 210 can then automatically determine which luminaire(s) is/are located in the same room or zone 102a as the user 106, or which luminaire(s) is/are currently closest to the user's estimated position. In another alternative, the database may map each microphone 108 to a nearest luminaire or luminaires 104, or to one or more luminaires 104 in the same room or zone as each microphone. Based on this, the controller 210 can then detect the user's position in terms of which microphone 108 his/her speech is currently detected through, and map this directly to a selection as to which luminaire(s) 104 to use to provide the feedback.

In an alternative or additional variation, the controller 210 is configured to use information within the lighting system to inform the choice of most appropriate luminaire or luminaires 104. E.g. a powerful uplighter may be chosen over a small under cabinet light even though it is further away, or a light with colour capabilities may be chosen over one with only dimming capabilities. Such information could be captured at commissioning based on product information or tagged by the user.

In further alternative or additional embodiments, the controller 210 may select a feedback effect in dependence on an effect currently being rendered by the lighting system 204. E.g. consider a scenario where the lights in one room 102a, where the user 106 speaks the command, are currently showing a certain scene such as a sunset scene, and now are also required to provide feedback on a voice command to be executed in another room 102a. In this case the controller 210 may select a feedback effect that blends in with the current scene.

In yet further alternative or additional embodiments, the controller 210 may be configured to select which luminaire 104 to use for feedback, and/or which feedback effect to use, based at least in part on the identity of the user 106 speaking the command. E.g. the feedback effect may be a user setting mapped to the identified user 106. Or as another example, the luminaire(s) and/or effect may be selected so as not to disturb another nearby user, or not to disturb an ambient lighting scene set by another user detected at another, nearby location.

FIG. 3 shows over time (left to right) some examples of the different ways the system 202 can respond, with reference to the example feedback ID codes set out in Table 1 above.

Whenever the user 106 issues a voice command the control system 202 goes to the first stage of processing and indicates that it is receiving a voice command. This feedback is shown at the feedback location, i.e. through a light source 104 that is close to the user, or that is in sight of the user. As discussed, there may be different ways that the system determines which light is close to the user, example beaconing technology, passive infrared, camera vision, etc. In embodiments this comprises determining the room 102a that the user is in. The feedback light(s) could also be different depending on which voice receiver 108 receives the commands.

As the user speaks, the system 202 directly processes the voice command and continuously updates the feedback (e.g. animation) that is shown to the user 106.

The upper timeline on the page shows an example feedback type that may be referred to herein as "Regular Animation". Whenever the user 106 starts speaking a voice command the lighting system 204 displays animation 01 to provide feedback to the user 106 that the control system 202 is listening. Once the user 106 completes the voice command the lighting system 204 goes to animation 02 to indicate to the user 106 that the control system 202 has stopped listening, then goes to 03 to inform the user 106 that it is processing the voice command. Then animation 04 is shown to the user 106 to acknowledge successful processing of the command by the system. This last animation 04 might instead be skipped and the effect may be rendered directly.

In one embodiment the user 106 issues a voice command for a location 102b that he/she is not currently located in. So the execution location and feedback location are not co-located. For example, the user 106 is on his sofa and wants to prepare his bathroom to take a relaxing bath. He starts the voice command "<System name>"—the system 202 picks a light that is close to the user and displays animation 01 to identify to the user that it is listening. The user then continues " . . . prepare the bathroom with my relaxing scene". During the voice command the system 202, 204 displays animation 01. Once the user 106 has completed the command the system displays animation 02 to confirm that it has stopped listening and then displays animation 03 to show that it is thinking Once the controller 210 receives confirmation from the lighting system 204 it displays animation 04 to show to the user 106 the command was received, processed and properly executed.

The middle timeline on the page shows another example feedback type that may be referred to herein as "Direct Animation". Here the feedback is provided as the user speaks. For example, in the same scenario as set out above, the user says "<System name>, set the lights in my bathroom . . . ". The control system 202 directly processes the voice command and recognizes that there is no room named 'bathroom'. It therefore shows effect 05 to the user 106 after he says 'bathroom', which gives direct feedback to the user 106 of the point at which the command has failed. The system may fail at any given element 51, 52, 53. This will help the user 106 to better understand the capabilities of the system as he receives direct feedback on errors.

Another example feedback type is illustrated in the bottom timeline on the page of FIG. 3, which may be referred to herein as "Direct Preview". In such embodiments the execution location and feedback location are similar. In this situation the lighting system 204 can directly show the processed voice command as the user 106 speaks it. For example the user has an open-plan room with three 'areas': one named 'Kitchen', another named 'Dining' and a third named 'Living'. As the user 106 says 'Set the lights . . . ' all lights 104 display the 01 animation. He continues ' . . . in my living room . . . ': the lights in the Kitchen and Dining stop displaying the animation. The user 106 then says ' . . . to my sunset scene': the lights 104 in the Living room then go to the sunset scene.

Variants of any of the above feedback types may be referred to herein as "Graceful Degradation". Here, lights 104 with lesser capabilities (for example, not colour capable) will render to the best of their efforts the animation. When the lighting system determines a light to display the feedback on it will aim to select the most capable luminaire 104 that is close to the user 106.

It will be appreciated that the above embodiments have been described only by way of example.

For instance, in smart home applications there may be many appliances that have no feedback capabilities. For example, utilities such as window blinds, heating systems, air conditioning systems and ventilators can only be switched on and off. It may not be apparent to a user that an erroneous voice command which addresses one of these devices will not be process. Therefore the lighting system 204 could also act as feedback mechanism to other smart home appliances. In such embodiments the controller 210 is coupled to the utility system in question (not shown) and configured to control this in accordance with the voice command recognized by the speech recognition algorithm, but is still also coupled to the lighting system 204 in order to use this to provide feedback on the processing of the voice command.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of using speech recognition to control a utility, the method comprising:
   receiving a speech command spoken by a user and captured by at least one microphone;
   processing the speech command in order to automatically recognize and enact an intention of the user in each of a sequence of spoken elements in the command, the elements having an order from first to last in time, with at least one of the elements of the command indicating an intention of the user to control the utility and a further one or more of the elements of the command each specifying a respective parameter of the control intended by the user; and
   after the speaking of the first element in the voice command but prior to enacting the last element of the command, controlling illumination emitted by one or more luminaires of a lighting system to provide feedback to the user regarding the processing of the speech command, wherein the feedback comprises providing a preview of individual effects of one or more of the spoken elements of the command.

2. The method of claim 1, further comprising:
   automatically determining a location of the user, based thereon automatically identifying at least luminaire visible from the determined location of the user, and automatically selecting the one or more luminaires through which to provide said feedback from amongst the at least one luminaire identified based on the determined location of the user.

3. The method of claim 2, wherein the determining the location of the user comprises at least detecting a room in which the user is located.

4. The method of claim 3, wherein said utility comprises illumination emitted by one or more other luminaires of the lighting system other than the one or more luminaires through which said feedback is provided.

5. The method of claim 1, wherein said utility comprises the illumination emitted by at least one of the one or more luminaires through which said feedback is provided.

6. The method of claim 1, wherein said feedback comprises at least: acknowledging when the last element has been successfully recognized and is in the process of being executed in order to be enacted.

7. The method of claim 1, wherein at least part of said feedback is provided prior to the speaking of the last element of the command.

8. The method of claim 7, wherein said feedback comprises at least acknowledging that the first element of the command has been recognized.

9. The method of claim 7, wherein said feedback further comprises at least an indication that there was an error in recognizing a given element of the elements of the command, thereby prompting the user to re-speak said given element.

10. The method of claim 1, comprising automatically selecting the one or more luminaires through which to provide said feedback based on which luminaires of the lighting system are capable of rendering the feedback.

11. A computer program product comprising code embodied on a non-transitory computer-readable storage medium, wherein the code, when run by one or more processors, causes the one or more processors to perform the method of claim 1.

12. A control system comprising:
   memory comprising one or more memory units, the memory storing code; and
   one or more processors configured to run the code from said memory, wherein the code, when run by the one or more processors, causes the one or more processors to perform the method of claim 1.

* * * * *